United States Patent Office 3,122,420
Patented Feb. 25, 1964

3,122,420
DIAGNOSTIC FORMULATION FOR pH
DETERMINATION
John Rebar, Jr., and Paul W. Oakes, Elkhart, Ind., and
Wayne A. Freeby, Idaho Falls, Idaho, assignors to
Miles Laboratories, Inc., Elkhart, Ind., a corporation
of Indiana
No Drawing. Filed Feb. 28, 1962, Ser. No. 176,454
5 Claims. (Cl. 23—253)

This invention relates to new and improved diagnostic composition. Particularly the invention relates to diagnostic compositions which are useful for the quantitative determination of the hydrogen ion concentration in fluids, particularly body fluids such as urine. More especially, it embraces a pH indicator test for use in combination with one or more other tests, i.e., glucose, albumin, etc., all of which may be performed in a single "dip and read" operation.

A pH determination, to be of greatest value, must be conveniently rapid, dependable and simple enough for the technician to use with ease, accurate enough to serve the clinician, and sensitive enough to reflect variations in the patient's condition. Moreover, the reagent composition must be adequately stable.

We have now found a new formulation for preparing the pH test portion of a "dip and read" type of indicator test strip which offers a superior means for investigating biological fluids for their hydrogen ion concentration. This unique pH test mixture comprises an indicator material which in the form of a solution is used to impregnate a desired portion of the bibulous carrier.

The pH test area of such a combination test stick has heretofore been prepared according to a formula which included various indicators, alcohol, wetting agents and polyvinyl alcohol in aqueous solution.

This formulation was unsatisfactory, however, with respect to the drying time and temperature range which was required to adequately dry the pH test area. Temperatures had to be varied between 75 and 80° C. and a minimum drying time of about 8 minutes was required. Frequently, moreover, the sticks were still wet at the end of the 8 minute period and the drying time had to be increased to 11 minutes.

Another disadvantage of this formulation was a discoloration of the test portion of the stick which resulted from the high temperatures used in drying. Particularly in diagnostics containing several test portions high temperatures were used in order to dry all of the reagents on the stick in one operation. A large percentage of the sticks containing the above type of formulation were rejected because of the undesirable color resulting from such processing steps.

Since polyvinyl alcohol was believed to be responsible for discoloration of the previously used formulations, a new formulation was prepared by replacing the polyvinyl alcohol with certain other ingredients which are capable of imparting stability and improved color to the test area. It was found that the desired color uniformity and stability could be produced by a novel mixture of three ingredients in addition to the previously used indicators, wetting agents and alcohol. These ingredients are:

(1) Bodying and stabilizing agent
(2) Color dispersing agent
(3) Color intensifying agent The body and stabilizing agent selected for use in these diagnostic formulations is a refined extract of carrageen, sometimes referred to as Irish moss. From it, most of the metallic ions present in Irish moss have been eliminated with the exception of the sodium ion. Thus, this ingredient is in effect, substantially a sodium carrageenate. It has an externally low chloride content and forms clear viscous solutions without the usual gel formation induced by temperature changes which is typical of regular Irish moss extracts.

The color dispersing agent may be any polymeric material which is soluble in aqueous solution and which has the property of giving a uniform color dispersion when added to dye formulations. Particularly preferred for this purpose is polyvinyl pyrrolidone.

The color intensifying ingredient is one which gives the color a brighter hue. For this purpose it has been found desirable to utilize a polyalkylene glycol. Various polyalkylene glycols are commercially available. Lower polyalkylene glycols have been found particularly useful for this purpose and in particular polyethylene glycol. Selection of a particular polyalkylene glycol will of course be decided by considerations of solubility as well as the color intensity obtained by the use of various polyalkylene glycols.

The above described three ingredients, which are primarily responsible for the results obtained in the use of the formulations of this invention are used in conjunction with a pH indicator, preferably one which will produce color changes in the range of about from pH 5 to pH 9. For this purpose various indicator dyes and combinations may be utilized. One found satisfactory is a mixture of Methyl Red and Bromthymol Blue. A mixture of these two ingredients in a proportion of one part Methyl Red to twenty parts Bromthymol Blue has been found particularly effective. Various other indicator combinations may be used if desired.

A wetting agent is also utilized in preparing the formulations of this invention. Various types of wetting agents are satisfactory for this purpose.

The ingredients are finally dissolved in an aqueous lower aliphatic alcohol solution, for example an ethanolic solution.

The above described formulation is most advantageously used by absorbing the formulation upon a bibulous carrier. For this purpose, paper strips or other suitable bibulous materials may be used. Following the absorption of the formulation by the bibulous carrier, the resulting test strips are dried at temperatures in the range of about from 80° C. to 105° C. for a period of about from 5 to 10 minutes. Upon cooling, the strips are then ready for use in the form of "dip and read" diagnostic strips.

This invention will be better understood by reference to the following example. It is included merely for purposes of illustration, however, and is not to be construed as in any way unduly limiting the scope of the invention which is defined in the claims appended hereto.

Example

The following materials were mixed together and bibulous paper strips impregnated therewith by dipping the strips into the mixture.

| | | |
|---|---|---|
| Methyl Red | gm | 0.144 |
| Bromthymol Blue | gm | 2.88 |
| Wetting Agent (Tween 21) | gm | 2.88 |
| Ethanol (absolute) | ml | 3024.0 |
| Water (distilled) | ml | 4367.0 |
| Refined carrageen extract (Viscarin) | gm | 25.2 |
| Polyvinyl pyrrolidone (Plasdone) | gm | 36.0 |
| Polyethylene glycol | gm | 36.0 |
| (Average molecular weight 4500.) | | |

After dipping, the strips were dried for seven minutes at a temperature of 100° C. plus or minus 5° C.

These strips after cooling were tested in solutions of known pH. The colors observed at various hydrogen ion concentrations were as follows:

| | pH |
|---|---|
| Orange | 5 |
| Orange-yellow | 6 |
| Yellow-green | 7 |
| Green | 8 |
| Blue | 9 |

The advantages of the formulations of this invention exemplified by the example above reside not only in the ease of formulation, but also in the stabilizing of the resulting diagnostic sticks under relatively severe conditions of heat and humidity. In addition, the colors developed can be readily distinguished at various pH ranges and are of an intense enough hue to be easily read. Use of a color chart, for example, will enable the user of these sticks to accurately determine the pH of the solution, such as urine, being tested.

In summary, this invention provides a novel formulation which is utilized in a composition for determining the pH of various solutions including biological fluids such as urine. The formulation contains in addition to the necessary indicator, wetting agent and alcoholic base, a mixture of a bodying and stabilizing agent such as a refined carrageen extract, a color dispersing agent such as polyvinyl pyrrolidone and a color intensifying agent such as a polyalkylene glycol.

What is claimed is:

1. A diagnostic composition for use in determining the hydrogen ion concentration of biological fluids which comprises an indicator composition which exhibits a color change upon being subject to a change in hydrogen ion concentration, a refined carrageen extract, polyvinyl pyrrolidone and a polyalkylene glycol impregnated upon a bibulous carrier.

2. A product according to claim 1, wherein the indicator composition consists of a mixture of Methyl Red and Bromthymol Blue in a proportion of about 1 part Methyl Red to 20 parts Bromthymol Blue.

3. A product according to claim 1 wherein the polyalkylene glycol is a polyethylene glycol.

4. A product according to claim 1, wherein the refined carrageen is substantially a sodium carrageenate.

5. A diagnostic composition for use in determining the hydrogen ion concentration in human urine which comprises about 1 part Methyl Red, about 20 parts Bromthymol Blue, about 180 parts of a refined carrageen extract, about 230 parts polyvinyl pyrrolidone and about 230 parts of a polyethylene glycol having an average molecular weight of about 4500, all impregnated upon a bibulous carrier.

References Cited in the file of this patent

UNITED STATES PATENTS 2,567,445     Parker _____ Sept. 11, 1951